(12) United States Patent
Salvesen

(10) Patent No.: US 11,494,715 B2
(45) Date of Patent: Nov. 8, 2022

(54) HIGH RESOLUTION FILM CREATION AND MANAGEMENT SYSTEM

(71) Applicant: FILM IT LIVE, INC., Los Angeles, CA (US)

(72) Inventor: Christopher Larson Salvesen, Los Angeles, CA (US)

(73) Assignee: FILM IT LIVE, INC., Los Angeles, CA (US)

( * ) Notice: Subject to any disclaimer, the term of this patent is extended or adjusted under 35 U.S.C. 154(b) by 0 days.

(21) Appl. No.: 16/675,119

(22) Filed: Nov. 5, 2019

(65) Prior Publication Data

US 2022/0122024 A1   Apr. 21, 2022

Related U.S. Application Data

(60) Provisional application No. 62/756,567, filed on Nov. 6, 2018.

(51) Int. Cl.
*G06Q 10/06* (2012.01)
*G11B 27/031* (2006.01)
*G06Q 10/10* (2012.01)

(52) U.S. Cl.
CPC .... *G06Q 10/063118* (2013.01); *G11B 27/031* (2013.01); *G06Q 10/103* (2013.01)

(58) Field of Classification Search
CPC .......... G06Q 10/063118; G06Q 10/103; G11B 27/031

USPC ........................................................ 386/278
See application file for complete search history.

(56) References Cited

U.S. PATENT DOCUMENTS

| | | | |
|---|---|---|---|
| 2014/0164049 A1* | 6/2014 | Yakos ................ | G06Q 10/0633 705/7.27 |
| 2015/0199995 A1* | 7/2015 | Silverstein ........... | G11B 27/036 386/249 |
| 2016/0172002 A1* | 6/2016 | Sandrew .......... | H04N 21/47205 386/282 |

* cited by examiner

*Primary Examiner* — Thai Q Tran
*Assistant Examiner* — Nienru Yang
(74) *Attorney, Agent, or Firm* — Rupak Nag

(57) ABSTRACT

A film creation and management system and platform enables efficient, cost-effective, collaborative, and secure creation of filmed or interactive content. A system and platform for creating high-resolution filmed content in an efficient, fast, secure, and collaborative manner are described. The system is a wide-ranging filming tool and film management system that enables cost-effective creation and manipulation of 8K or other high-resolution content. It has interfaces and tools for managing all stages of the film creation process from story development to post production, including marketing and administration. One objective of the system is to facilitate the transition of creating high-resolution content to a property that has a business outcome, thereby facilitating the transition from art to commerce.

3 Claims, 5 Drawing Sheets

HIGH RESOLUTION FILM CREATION AND MANAGEMENT SYSTEM

CROSS-REFERENCE TO RELATED APPLICATIONS

This application claims priority under 35 U.S.C. § 119(e) to U.S. Provisional Application No. 62/756,567, filed Nov. 6, 2018, entitled "High Resolution Film Creation and Management System", the contents of which are hereby incorporated by reference.

BACKGROUND OF THE INVENTION

1. Field of the Invention

The present invention relates to software and hardware for creating and managing high-resolution filmed content. More specifically, it relates to processes and systems for manipulating and processing filmed content and creating a final filmed output.

2. Description of the Related Art

The amount of filmed content being created using high-resolution media, such as 8K and 3D filming, is growing at a rapid pace. However, current tools, programs, systems, networks, and the like are not well suited or even capable of handling high-resolution content. The tools that are able to adequately process and manipulate such data efficiently, quickly run into storage issues. Current high-resolution content, in most cases 8K content, is significantly voluminous—even orders of magnitude more—than conventional content.

Another issue with handling high-resolution content (herein referred to as "8K" for ease of illustration) is ensuring that the content is secure when it is transmitted over a network or stored on remote servers, referred to as the cloud (e.g., hacking) or transported in the form of a physical device (e.g., intercepted). Currently, there are no efficient, sufficiently secure means for working with 8K content. This is particularly true when dealing with transmission over the internet. Related to this point, it is generally not acceptable or does not follow good industry practice to use compressed files for transmission and uncompressing when received as this degrades the quality of the files, thereby lowering resolution from the original filming.

What is needed is a wide-ranging filming tool or film management system that enables highly efficient, secure, and cost-effective creation and manipulation of 8K or other high-resolution content. It would be beneficial if such a system had interfaces and tools for managing all stages of the film creation process from story development to post production, including marketing, distribution, and finance/administration. The broader, higher level objective of such a film management system would be to facilitate the transition of creating high-resolution content or, more broadly, art, to something that has a business outcome; in other words, a system that makes it easier to transition art to commerce.

SUMMARY OF THE DESCRIBED EMBODIMENTS

In one aspect of the invention, a system and platform for creating high-resolution filmed content in an efficient, fast, secure, and collaborative manner are described. The system is a wide-ranging filming tool and film management system that enables cost-effective creation and manipulation of 8K or other high-resolution content. It has interfaces and tools for managing all stages of the film creation process from story development to post production, including marketing and administration. One objective of the system is to facilitate the transition of creating high-resolution content to a property that has a business outcome, thereby facilitating the transition from art to commerce.

A system for creating a master content timeline for a project is described. One module included in the system or platform is a story development module for determining a project type based on initial project data and from where an initial content timeline for the project is created. Another module is a pre-production module that receives the initial content timeline and creates a production script for the project. A production module receives unedited, uncompressed, and high-resolution content. It segments the production script into multiple script elements where the script elements are placed into a desired sequence, thereby creating a secondary content timeline containing the high-resolution content. A post-production module receives the secondary content timeline and creates a master content timeline for the project by compositing the multiple script elements.

In another embodiment, the platform also includes a marketing module that enables marketing functions for the project using best practices and ensuring compliance with guidelines and security rules, and is utilized throughout creation of the project. This module and all modules in the main embodiment described herein are customizable based on project parameters.

Another aspect of the present invention is a method of creating a master content timeline for a project. A project type based on the initial project data is determined and an initial content timeline is created. This leads to the creation of a production script (similar to a shooting script). Once principal photography or filming is complete or during shooting, the system receives unedited, un-compressed, high-resolution content. The production script is segmented into multiple script elements and then compiled into a desired sequence. A secondary content timeline containing high-resolution content is created. The multiple script elements are composited and a master content timeline for the project is created.

DETAILED DESCRIPTION

Figure 1:
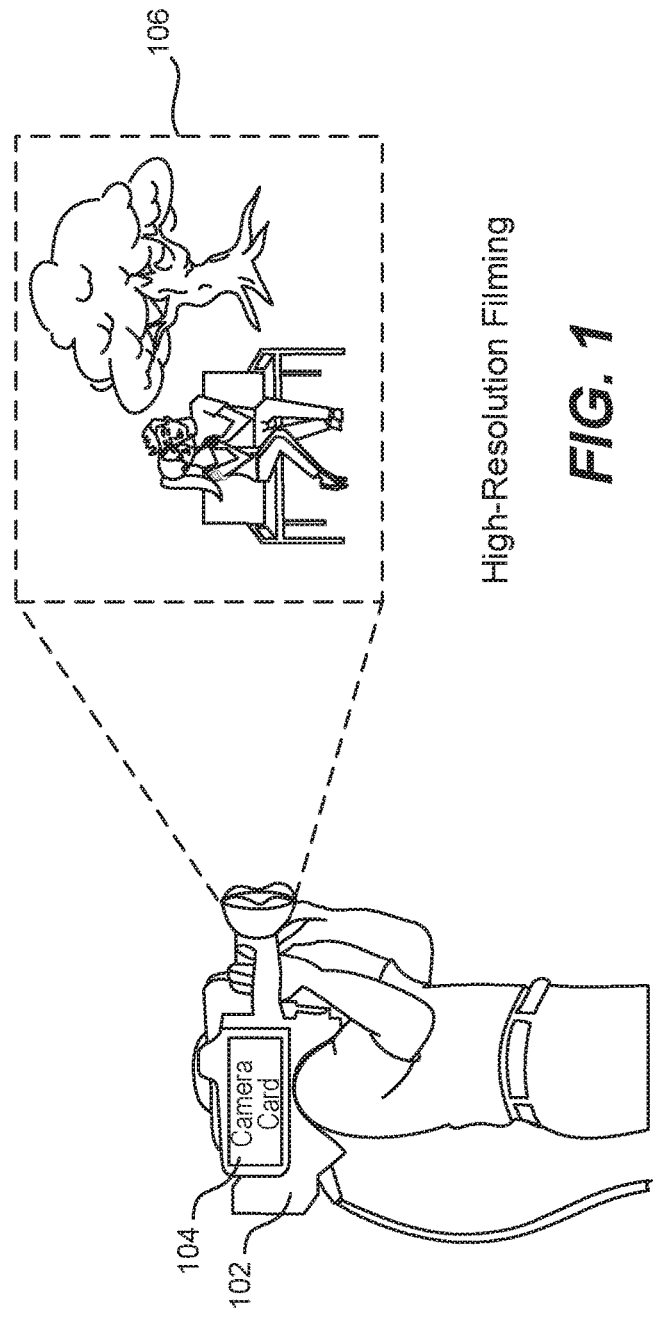
FIG. 1 is a block diagram illustrating one scenario in which embodiments of the present invention may be utilized in accordance with one embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the present disclosure as defined by the appended claims.

For example, the systems and methods of the present disclosure will be described in the context of filming feature films and TV shows in 8K. Numerous other embodiments may include filming, for example, commercials, trailers, and short videos in other high-resolution media, besides 8K. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity.

However, it should be noted that some embodiments include multiple iterations of a technique unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

In one embodiment, the present invention is a platform for managing the filming of content in 8K media. The platform includes a system, more specifically, one or more servers under the control of a service provider, and multiple software modules, also referred to as operating platforms, for performing various functions, all related to creating and managing the 8K content from story development, principal photography to editing and post production, resulting in a final, master timeline, as described below.

Embodiments of the present invention enable hands-on and in-house participation of individuals working on a project, as described below. One result is that there is less outsourcing of project tasks and jobs. Everyone working on a project, whether it be for a high-budget feature film, an interactive video, or trailer, is catalogued in the system. Because the entire lifecycle of the project is involved, that is, the platform begins with story idea all the way to marketing and distribution, the modules described below enable, if needed, hour-by-hour accounting and expense tracking for the entire project. All data related to the different stages of the project are stored for analytics. The degree and extent of the data stored may be set by the project leads at the outset.

FIG. 1 is a block diagram illustrating one scenario in which embodiments of the present invention may be utilized in accordance with one embodiment. A person or member of a film crew is filming a scene 106 using a high-definition camera 102. Camera 102 contains or is attached to a camera card 104 or equivalent. The camera card or other storage device contains filmed 8K content. Typical cards such as card 104 are now able to store larger amounts of data as storage technology improves. When storing 8K content, such cards reach full capacity quickly, especially when compared to storing lower resolution data. For example, a mere 10 minutes of 8K data may require 30-40 GB (?). When filming in 8K, it is not unusual to have to take out and replace camera card 104 frequently, certainly more than when filming in conventional media.

Figure 2:
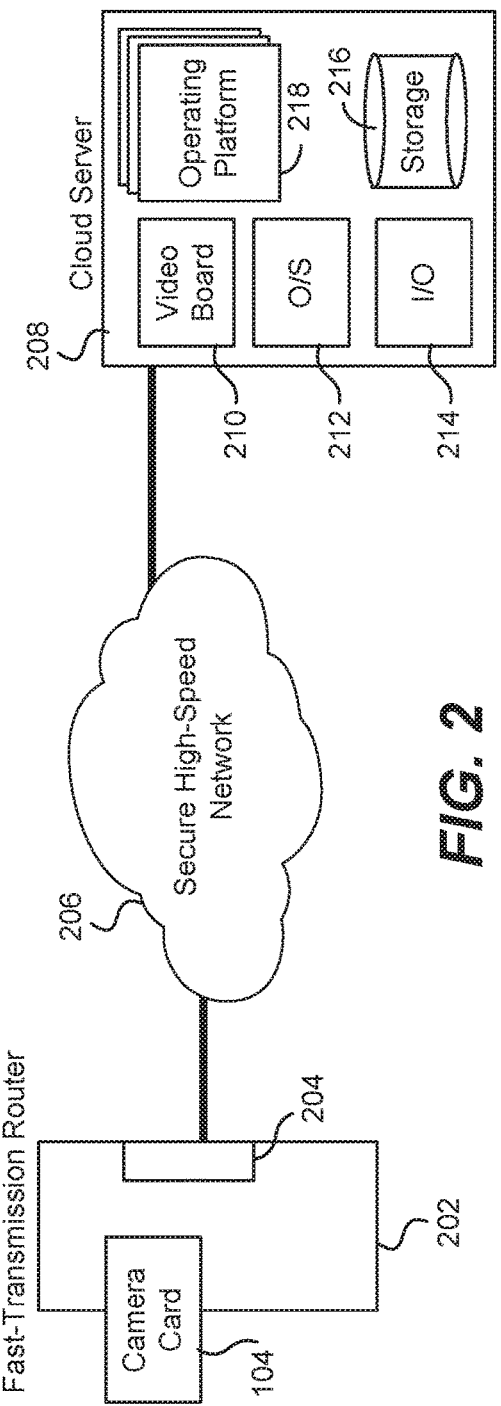
FIG. 2 is a block diagram showing an overview of a film management and creation system in accordance with one embodiment.

FIG. 2 is a block diagram showing an overview of a film management and creation system in accordance with one embodiment. As can be seen from the diagram, there are three general components: a fast transmission router 202, a secure high-speed network 206, and a cloud server 208. It is cloud server 208 that is at the center of the present invention. In one embodiment, as noted, cloud server 208 (representative of one or more physical and/or virtual server computers) is under the control of, managed by, and in most cases owned by a third-party service provider. This service provider offers high-resolution film creation and management services to customers, such as movie studios, production companies, film crews, independent film and TV producers, to name a few examples.

Camera card 104 or other type of suitable storage device first referenced in FIG. 1 is inserted or in some manner made readable by a fast-transmission router 202, as shown in FIG. 2. One component of router 202 is a data transmission component 204. In one embodiment, this component may be a Truffle. It enables fast and secure transmission of high volumes of data over a network. The 8K video data is unloaded from card 104, processed by component 204, and transmitted onto a secure high-speed network 206. Network 206 can be a dedicated data pipe (e.g. T1 or T3 line provided by a commercial carrier, such as AT&T). The data is transmitted over network 206 and received by cloud server 208.

Server 208 has several hardware and software components and modules. It receives raw, unedited 8K content (or any other high-resolution content). Once the raw data is on cloud server 208, it is secure. In one embodiment, the commercial component that transmits the data from the router (e.g., a Truffle) provides embedded security in the data. In cloud server 208 some of the hardware and software components and modules are standard items needed to operate the server for the purposes of this invention: video board 210 (this can be internal to the server or connect to it, and can handle 8K data, 3D data, and others), operating system 212, and input/output hardware and interfaces 214. Although some of these components may be modified from standard configuration in order to implement the present invention, they are not essential to embodiments of the invention. Another standard component is storage 216. This storage is conventional storage but the volume of data that it can store is large. Naturally, the amount of storage can be expanded as needed to the order of tera- or petabytes. The storage can also be in separate physical servers. In any case, the amount of storage and how this storage is implemented can be done using conventional means.

In an alternative embodiment, cloud server 208 may also need to transmit edited 8K content to another device, such as one or more routers or computers. As such, server 208 may also have a Truffle router or component in it or operating in conjunction with it. For example, editing teams may need to transmit from cloud server 208 to individuals or entities in different places around the world. However, this is an alternative embodiment and may have other requirements. The basic configuration of cloud server 208 does not include a Truffle router or an equivalent component.

Operating platform 218 is comprised of multiple software modules or programs. As described in more detail below, each one of the programs can be customized by the service provider to meet the needs of the customer. Generally, the programs can be tailored or modified to meet the needs of and give guidance to, for example, a filmmaker or production company. This guidance can be of a wide variety ranging from academic filmmaking guidance to providing common sense guidelines for filming, marketing, distribution, and other facets and stages of creating and disseminating new content. The operating platforms may include a story development program, a pre-production program, a production program, a post-production program, and platforms for marketing, distribution, and accounting/general administration.

Figure 3:
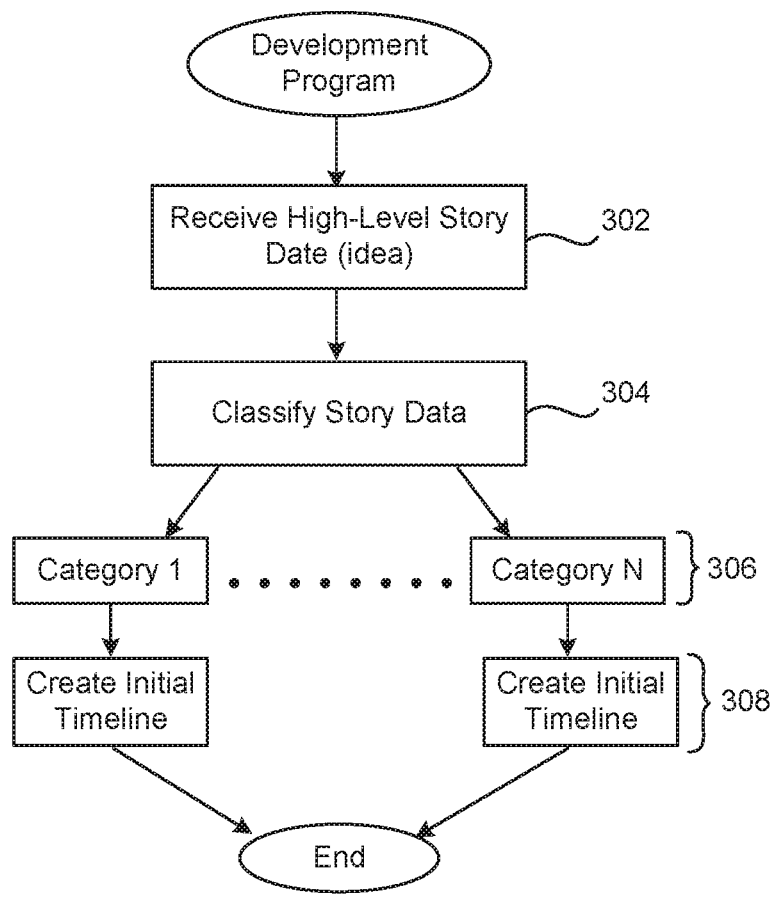
FIG. 3 is a flow diagram of a development program or operating platform in accordance with one or more embodiments.

FIG. 3 is a flow diagram of a development program or operating platform in accordance with one embodiment. At step 302 a development program executing in cloud server 208 operated by the service provider accepts as input a high-level story idea or, more specifically, data on the content that the user intends to film. This will typically be narrative text describing the general story outline or, if an outline has not yet been formed, a general story idea. It breaks down the input from the user or film maker and determines what type of story it is. At step 304 the story data is analyzed to determine the type or classification of the story idea. A few examples of story classifications are commercial, short video, TV series, feature film, documentary, interactive, fantasy sports, e-gaming, and so on. The story idea is also analyzed to determine what type of audience the story idea may draw or what type of audience is most suitable for the story idea.

Once the story idea has been classified into one or more categories, it is labeled as such at step 306. For example, the story idea may be classified in the feature film category and in the TV episodic series category. Of course, the number and types of story idea categories can change over time and is likely to grow in light of the number of different channels and outlets for distributing filmed content. In short, the development program guides the film maker into the right "room" for his or her content. This is done using a mix of academic tenets of film making, common sense guidelines, and other features, such as social impact and security.

At step 308, an initial timeline is created. Given that only a story idea or, at best, a story outline is provided as input to the development program, the initial timeline created at step 308 is rudimentary. It may show only short descriptions of, for example, the first, second and third acts of a feature film. It is helpful to note here that the concept of a timeline is the underlying base and structure of the content as it evolves from the development program all the way to the post-production program. In other words, projects are based on timelines. As such, the approach of the high-resolution film creation and management system of the present invention centers, at least in part, on the evolution of content timelines in each stage of the process.

Once the initial timeline is created at step 308 the processes in development program are completed. The output from the development program may be the initial timeline and a synopsis of the story or even a treatment (as this term is used in the film and TV industry), depending on how much input the development program receives from the film maker.

Figure 4:
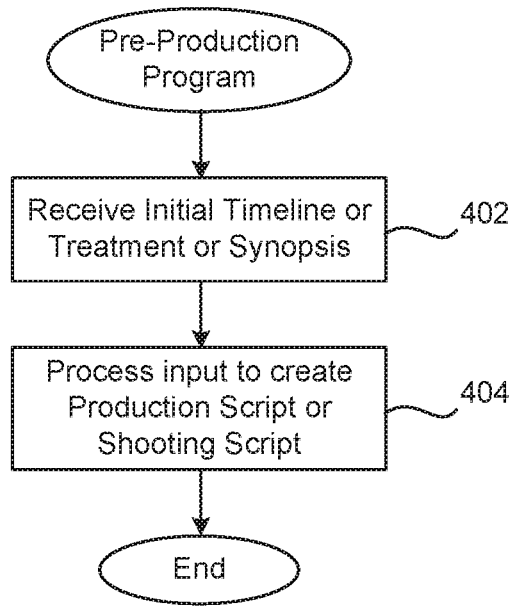
FIG. 4 is a flow diagram of a pre-production operating platform in accordance with one embodiment.

FIG. 4 is a flow diagram of a pre-production operating platform in accordance with one embodiment. This program takes the output from the development operating platform, such as a synopsis, treatment and/or initial timeline and essentially breaks it down into a production script, as this term is defined in the film and TV industries. That is, it executes a series of functions that transforms development program output into a script that can be used for shooting, also referred to as physical production or principal photography. At step 402 the pre-production program receives the initial timeline and other output from the development program, such as a synopsis or treatment of the story idea. At step 404 the input is processed to create a production or shooting script. The level of detail of this script may depend on how much input is provided by the film maker or user. In one embodiment, the user may add more input about the story at the end of development program execution to make the pre-production program output more detailed and useful.

Figure 5:
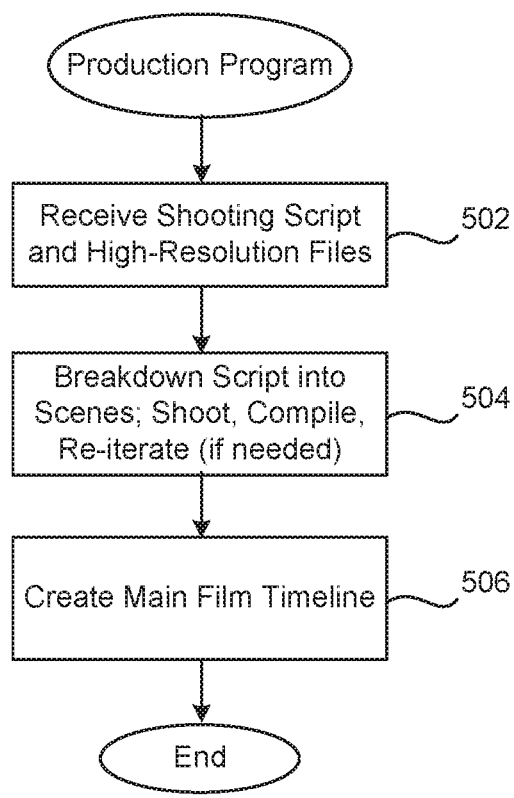
FIG. 5 is a flow diagram of a production operating platform in accordance with one or more embodiments.

FIG. 5 is a flow diagram of a production operating platform in accordance with one embodiment. Before this process executes the film maker has shot raw, unedited 8K filmed content (if required by the project). In other words, a major part of the project has taken place between the pre-production program and production program: principal photography has begun, if needed. As such, the system now has, as noted, raw 8K content and output from the pre-production program which, in one embodiment, is the shooting script.

At step 502 the program receives the shooting script and the 8K files created that day (or during any suitable time period selected by the film maker). The 8K content files are received by cloud server 208 via means described in FIGS. 1 and 2 above. At step 504 the shooting script is examined and segmented (or broken) into sequences, scenes, and other script elements, such as beats, if desired by the film maker. In the described embodiment, the script is broken down into the basic script segment, namely, scenes. The film maker is given the opportunity to shoot and compile, and then re-iterate this process as many times as needed. For example, a film maker may shoot the same scene five times and compile different parts of the scene into a complete, finished scene (i.e., the compiling step).

Cloud server 208 and operating platforms 218 of the present invention facilitate this type of real time "shoot-compile-reiterate" process of 8K or other high-resolution data in a fast, collaborative, and secure manner. At step 506 the main content or film timeline is created in a period of time for high resolution content that was previously not commercially feasible. This main timeline has scenes which can now be viewed or seen, and which contains scenes that have gone through the "shoot-compile-reiterate" process. The main timeline has input from multiple parties (if needed for the specific project) and all decision makers have agreed to the scenes comprising the timeline. The output of the production operating platform is a main or primary timeline for the content, one which contains scenes that can be viewed.

Figure 6:
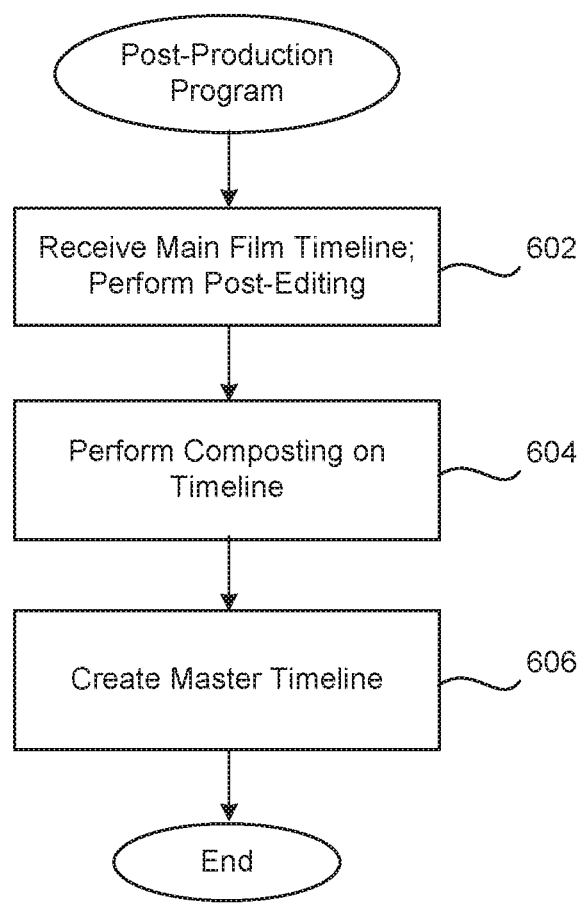
FIG. 6 is a flow diagram of a post-production operating platform in accordance with one or more embodiments.

FIG. 6 is a flow diagram of a post-production operating platform in accordance with one embodiment. In the post-production program, connections are needed to transmit large 8K content files. They are transmitted to individuals or entities that are responsible for compositing the content. As is known in the industry, composites are activities done to the footage. These include computer graphics, studio work, and other conventional post-production tasks. The composites include all such changes. At step 602 the post-production program receives the main timeline for the content. Some preliminary or post-editing may be performed on the timeline. This post-editing is done by individuals, referred to as post-editors in the industry.

At step 604 the compositing, described above, is performed using tools, applications, and software conventionally used for such activities by the individuals in the post-production team. At step 606 post-production program creates what is referred to as a master timeline, the finished 8K content (TV show, feature film, ad, short video, movie trailer, and so on). This master timeline is created in a much shorter time than would be possible under conventional tools and methodologies and is done securely and in a manner that ensures collaboration and input from all creative and technical team members.

As noted above, cloud server 208 has other operating platforms that are not directly related to creating the master timeline. These include a distribution platform or module, a marketing module, and financial/administration module.

In one embodiment, a marketing module enables the film maker's team to perform marketing functions. This module incorporates film and TV best practices, common sense marketing principles, and other marketing rules so that marketing operations are more likely to succeed. An important aspect of the marketing module is that it ensures compliance with marketing guidelines and rules, in particular rules regarding security of the project thereby taking measures to prevent leaks. It does this while the project is being filmed and produced, that is, while the modules described above are being used.

In one embodiment, each person on the project, for example, film maker's team or crew, is catalogued and is assigned a code and role that correlates to the marketing and other modules. Another module is the distribution module which incorporates the protocols and guidelines, such as film format, game format, among many others, for a specific production company or studio that the project leader is working with and whose rules and guidelines the project must comply with. It is critical that these rules are followed and the distribution module helps ensure that they are and done concurrently with the filming and creating of the project. The distribution module also enables distribution or transmission of the filmed content directly to the studio or production company, an important aspect given the volume and size of the files being created, as discussed above.

Figure 7:
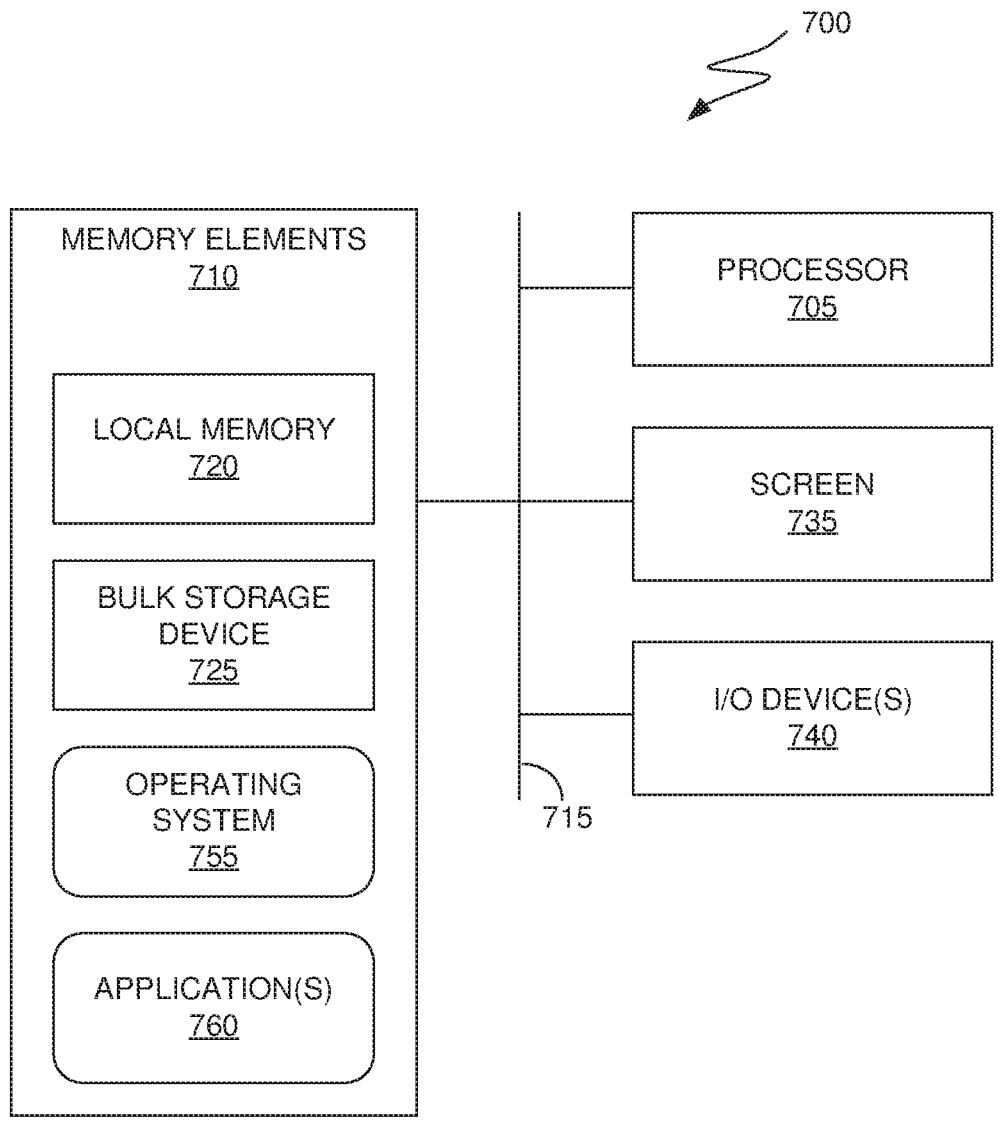
FIG. 7 is an illustration of a data processing system 700 is depicted in accordance with one embodiment.

FIG. 7 is an illustration of a data processing system 700 is depicted in accordance with some embodiments. Data processing system 700 may be used to implement one or more computers used in a controller or other components of various systems described above. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transmitted to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transmitted to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications channels, such as wireless communications channels, optical fiber cable, coaxial cable, a wire, and/or any other suitable type of communications channel.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of creating a master high-resolution content timeline for a project by using a system and platform for creating high-resolution filmed content, the method comprising:
    receiving a high-level story data on high-resolution content to be filmed from multiple parties, wherein the high-level story data are analyzed to determine an audience type;
    receiving initial project data and timeline for determining a project type based on initial project data wherein the project type is determined by examining the initial project data;
    creating an initial content timeline and a synopsis for the project based on initial project data and project type;
    creating a production script for the project based on the initial project data and content timeline;
    receiving unedited, un-compressed, and high-resolution content from multiple parties;
    creating a main content timeline containing high-resolution content, wherein the main timeline is created using a reiterative shoot and compile process, and wherein the production script is segmented into a plurality of script elements;
    creating the master content timeline for the project by compositing a plurality of script elements using the main timeline into a predetermined sequence; and
    transmitting the master content timeline to distributors over the internet, said transmitting being done concurrently with said creating of the main content timeline, thereby facilitating collaboration within multiple team members.

2. A method as recited in claim 1 further comprising assigning a code and role to a team member from the team members.

3. A method as recited in claim 1 wherein creating a main content timeline containing high-resolution content utilizing a reiterative shoot and compile process further comprises:
    segmenting the production script into a plurality of script elements; and
    compiling the plurality of script element into a desired sequence based on the initial content.

\* \* \* \* \*